United States Patent [19]

Marcin

[11] 4,103,516
[45] Aug. 1, 1978

[54] LIMITED TORQUE DRIVE ROLLER

[75] Inventor: Richard Marcin, New Baltimore, Mich.

[73] Assignee: Newcor, Inc., Bay City,, Mich.

[21] Appl. No.: 785,927

[22] Filed: Apr. 8, 1977

[51] Int. Cl.² ............................................. F16D 7/02
[52] U.S. Cl. .................................................. 64/30 E
[58] Field of Search ...................... 64/30 E; 192/41 S

[56] References Cited

U.S. PATENT DOCUMENTS

| | | | |
|---|---|---|---|
| 2,302,110 | 11/1942 | Dow et al. | 64/30 E |
| 2,633,950 | 4/1953 | Phaneuf | 192/41 S |
| 2,939,561 | 6/1960 | Rudisch | 192/41 S X |

Primary Examiner—Milton S. Mehr
Attorney, Agent, or Firm—Blanchard, Flynn, Thiel, Boutell & Tanis

[57] ABSTRACT

A rotatable member is mounted through substantially normal bearing structure onto a shaft in rotating relationship therewith. A torque limiting drive device, such as a spirally coiled spring, is fitted between the rotatable member and the shaft for permitting transmission of torque therebetween. The spring permits only a limited torque to be transmitted between the rotatable member and the shaft such that, if this torque is exceeded, then the spring slips with respect to the rotatable member to thereby permit relative rotation between the shaft and the rotatable member.

6 Claims, 3 Drawing Figures

LIMITED TORQUE DRIVE ROLLER

FIELD OF THE INVENTION

This invention relates to a limited-torque drive mechanism and relates particularly to a rotatable member which is rotatably mounted on a shaft and has a torque-limiting drive device positioned therebetween for permitting a torque-transmitting driving relationship to be established between the shaft and the rotatable member.

BACKGROUND OF THE INVENTION

While a large number of limited-torque drive devices have previously been known and used for a wide variety of applications, same have in the past usually been somewhat complex and/or unreliable and/or not readily adaptable to easy selection of a desired torque-transmitting capacity. Particularly, such devices as known in the past have not been readily applicable for use in the mounting of rotatable members, such as associated with conveyor rollers, onto shafts by simple and inexpensive means comprising only a small, simple and inexpensive but reliable modification to the overall assembly. In addition, the known devices have not performed with the dependability and reliability necessary to insure optimum performance and uniformly repeatable torque-limiting characteristics over long periods of operation.

Therefore, the objects of this invention include:

1. To provide a limited-torque drive means which is readily adaptable to a rotatable member, such as a conveyor roller assembly, mounted on a shaft.

2. To provide such limited-torque drive means which requires only a slight structural modification so as to be readily adapted for use between a rotatable member and its supporting shaft.

3. To provide such limited-torque drive means wherein the means determining the torque-transmitting capacity of the assembly is a simple and inexpensive component which can be readily selected and/or replaced as desired for selecting the torque-transmitting capacity of the assembly.

4. To provide a limited-torque drive means which is inexpensive, durable and reliable.

Other objects and purposes of the invention will be apparent to persons acquainted with apparatus of this general type upon reading the following specification and inspecting the accompanying drawings.

BRIEF SUMMARY OF THE INVENTION

Briefly summarizing the invention, a rotatable member such as a drive sprocket is mounted onto a shaft through a standard antifriction bearing of any desired type. A non-circular spring is so shaped that when it is inserted between the rotatable member and the shaft, it creates a driving engagement therebetween. In the illustrated embodiment, the spring has an inner hub portion which is non-rotatably secured with respect to the shaft, and has an outer spring portion which creates one or more points of bearing engagement with an inner annular surface associated with the rotatable member. The pressure exerted on the rotatable member through these points of contact, and the frictional engagement at these points, thus permits a limited torque to be drivingly transmitted between the rotatable member and the shaft. When the load on the overall assembly exceeds the torque capacity permitted by the frictional engagement between the outer portion of the spring and the rotatable member, then the spring slips with respect to the rotatable member so as to permit relative rotation between the rotatable member and shaft. In the preferred embodiment, the spring is spirally wound and includes a ramp portion which extends between the hub and outer portions, which ramp portion spirally extends between one-half and one full revolution so as to result in points of engagement between the rotatable member and the outer spring portion which are of high yet uniform pressure, which pressure is hence not significantly effected due to surface roughness and/or wear.

DETAILED DESCRIPTION

Figure 1:
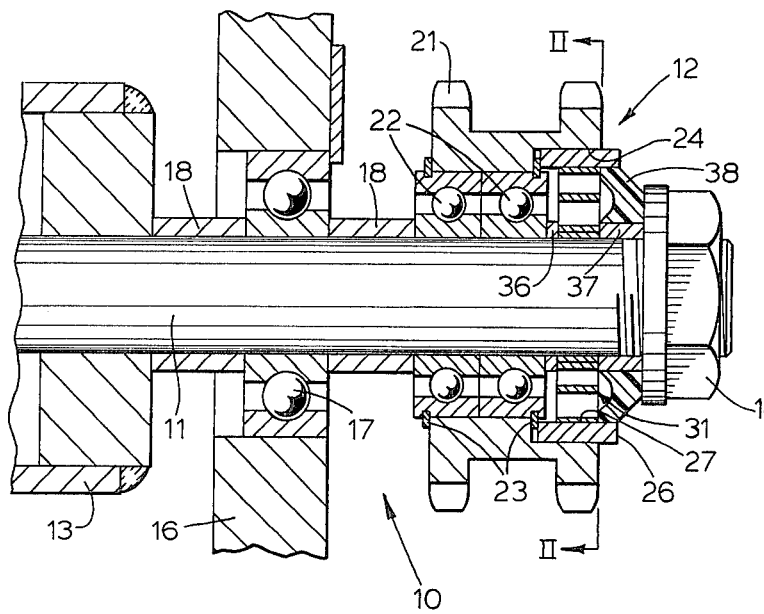
FIG. 1 is a fragmentary sectional view of a conveyor roller assembly embodying the present invention.

FIG. 1 illustrates therein a drive roller assembly 10, such as for use on a powered roller conveyor. This assembly consists of a roller 13 which is non-rotatably secured to a shaft 11, the latter being connected to a drive mechanism 12, The shaft 11 is rotatably supported in a frame 16 by conventional antifriction bearings 17. The axial relationhip of the roller 13 with respect to the frame 16 is maintained by means of appropriate sleeve-like spacers 18. A locking nut 14 is threadably engaged on the outer end of the shaft 11 for axially retaining the drive mechanism 12, and axially retaining the roller with respect to the frame.

The drive mechanism 12 includes a drive sprocket 21 rotatably supported on the shaft 11 by conventional antifriction bearings 22 which are held in fixed axial relationship by retainers 23. The sprocket 21 is, in the illustrated embodiment, a conventional chain sprocket which is suitably driven from a driving motor through an intermediate endless chain (not shown) so as to permit powered rotation of the conveyor roller 13.

The outer end of sprocket 21 is provided with a concentric annular recess 24 in which there is positioned a sleeve 26, the latter being press-fit into the recess so as to be non-rotatably connected to the sprocket. The sleeve 26, which has an inner annular surface 27, surrounds a resilient torque-limiting drive member 31 which provides a torque-transmitting driving connection between the sprocket 21 and the shaft 11. The drive member 31 includes an inner annular hub portion 33 which encircles the shaft 11 and is held in a non-rotative manner therewith by being clampingly held between the washer 36 and sleeve 37. This lattermentioned sleeve 37 is additionally provided with an annular seal 38 fixedly associated therewith so as to prevent dirt and other contaminating material from entering into the interior of the drive mechanism 12.

In the illustrated embodiment, the resilient torque-limiting drive member 31 (FIG. 3) is formed as a flat, spirally wound spring having the inner hub portion 33 wound to the approximate diameter of the shaft 11. This inner hub portion 31 is formed so as to include at least one complete coil and, in the illustrated embodiment, includes two complete coils which spirally surround one another.

Figure 2:
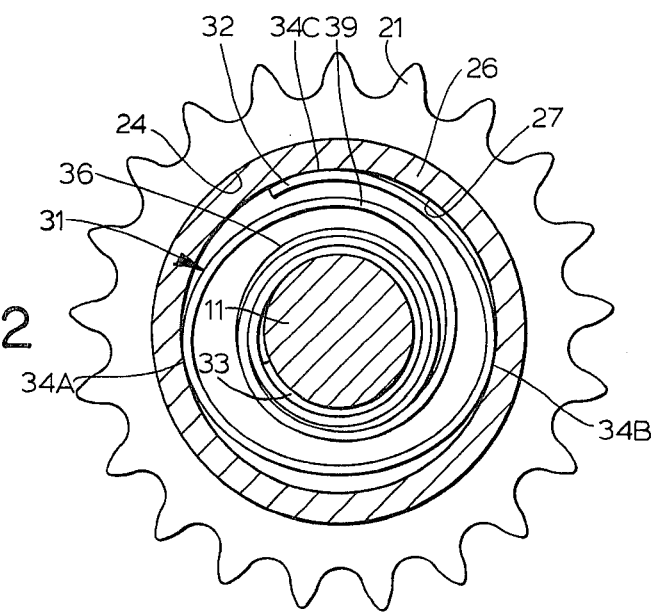
FIG. 2 is a cross-sectional view taken along the line II—II in FIG. 1.

The drive member 31 also includes an outer arcuate portion 32 which is generated on a diameter which is somewhat larger than the diameter of the inner surface 27 of sleeve 26, whereby when the drive member 31 is assembled within the sleeve 26 it is maintained in a compressed condition so that the outer arcuate portion 32 is thus resiliently urged into engagement with the surface 27. When in this assembled condition, the outer spring portion 32 frictionally engages the annular surface 27 at several angularly-spaced friction points, such as the points 34A, 34B and 34C illustrated in FIG. 2, at least one of which friction points is required for drivingly interconnecting the shaft 11 and sprocket 21, as described hereinafter.

The outer spring portion 32 is integrally joined to the inner hub portion 33 by an intermediate ramp portion 39 which is formed as a convolute or spiral which extends preferably from one-half to one full revolution about the shaft 11, and which extends radially outwardly between the inner hub portion 33 and the outer spring portion 32. This ramp portion 39, which in the illustrated embodiment extends through approximately three-quarters of a revolution, effectively acts as a long cantilever spring so as to resiliently urge the outer arcuate portion 32 into engagement with the inner annular surface 27 when the resilient member 31 is assembled within the sprocket.

By virtue of the substantial length of the intermediate ramp portion 39, the outer spring portion 32 can thus be resiliently urged into bearing engagement with the annular surface 27 so as to result in a substantially high compressive pressure therebetween, particularly since the surface 27 and outer spring portion 32 engage one another at only a small number of spaced points. This ability to achieve a fairly high compressive pressure at these points of contact, coupled with the substantial length of the ramp portion 39, thus results in the limited torque-transmitting capacity of the drive mechanism to be maintained with a high degree of uniformity and dependability even though the mechanism experiences substantial wear, as by being utilized for long periods of time. This arrangement of the resilient member 31, and its cooperation with the surface 27, also tends to minimize any torque-limiting variations caused by surface irregularities.

OPERATION

When it is desirable to move an object along a roller conveyor, which conveyor incorporates a plurality of parallel rollers substantially identical to the roller 13, a rotative drive force is applied to the sprocket 21 by means of a driving mechanism employing a chain (not shown). This rotative drive force is transmitted through the sprocket 21 and sleeve 26 to the resilient torque-limiting drive member 31 by means of the frictional contact points 34A, 34B and 34C. The drive force which is applied to the outer portion 32 of the drive member 31, at the above-mentioned points, is transmitted through the drive member 31 to the shaft 11 so as to cause rotation thereof, which in turn causes a corresponding rotation of the conveyor roller 13. So long as the driving force (which is dependent upon the resistance imposed on the sprocket by the roller, which in turn is a function of the load carried by the roller) remains below a preselected amount, the outer portion 32 of member 31 will remain in a non-slipping frictional engagement with the surface 27 so as to permit the roller 13 to thereby be driven in synchronism with the drive sprocket 21.

However, when the movement of an object being advanced along the conveyor is restricted to the extent that movement ceases, the resistance to the rotative driving force is transmitted reversely through the roller 13 and shaft 11 to the drive mechanism 12. The resistive effort of the shaft 11 transmitted to the resilient torque-limiting drive member 31 is increased to the extent that the rotative force of the drive mechanism 12 is greater than the cumulative frictional driving force transmitted through the friction points 34A, 34B and 34C. This results in slippage between the surface 27 and the outer spring portion 32, and hence relative rotation between the sprocket 21 and the shaft 11. The sprocket 21 can thus continue to be driven from its external driving source, even though the roller 13 may be stopped due to the external load imposed thereon. The rotative force applied to the sprocket 21 from the external drive source can continue uninterrupted until such time as the load or resistive force imposed on the roller 13 is removed, whereupon the torque-limiting drive member 31 will again cause the shaft 11 and roller 13 to rotate in unison with the sprocket 21.

While the form of the outer spring portion 32 and the spring characteristics of the ramp portion 39 determine the number of friction points between the portion 32 and surface 27, and the upper force limit at which the drive member 31 remains in a frictional non-rotative driving relationship with the sprocket 21, these portions 32 and 39 are desirably formed so as to result in only a small number of angularly spaced friction points between the portion 32 and the surface 27. By minimizing the number of friction points, a higher compressive pressure can be utilized at these points to thereby provide for dependable and uniform friction forces which are less susceptible to effects of wear and surface variations. While the present invention requires the use of only a single friction point as a minimum, nevertheless it is believed preferable to provide at least two such friction points which are disposed so as to engage the surface 27 at approximately diametrically opposed locations, since this positional relationship results in the resilient member 31 being totally confined and held by the surface 27, and the maximum internal energy of the resilient member 31 is effectively utilized so as to provide the desired frictional engagement with the surface 27.

Figure 3:
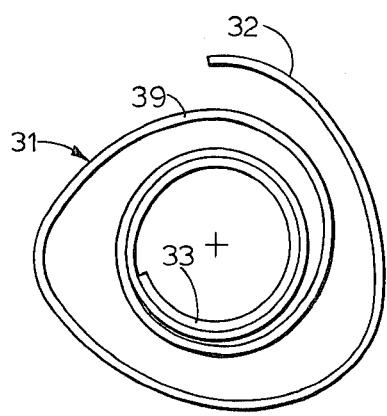
FIG. 3 illustrates the resilient torque-limiting drive member.

When the resilient member 31 is shaped as shown in FIG. 3, the outer arcuate portion 32 is generated about a center of rotation which is offset from the center of the hub portion 33, with the center of the hub portion 33 being disposed between the arcuate portion 32 and its center of generation. This arrangement results in the arcuate portion 32 itself creating several frictional contact points with the annular surface 27, such as the contact points 34B and 34C. This arcuate portion 32 preferably extends through a substantial arcuate extent, such as one-half to three-quarters of a revolution.

The torque-limiting drive arrangement of the present invention is particularly desirable for use in driving the rollers of a conventional powered roller conveyor since the external loads on the rollers often cause stoppage thereof so that most known roller conveyors of this type utilize different types of conventional clutch structures in order to permit this intermittent rotation of the rollers. The present invention, by utilizing the torque-limiting drive mechanism formed by the resilient member 31, provides the desired mode of operation by utilizing an extremely simple structure, inasmuch as the driving sprockets can be continuously driven and rotatably supported on the roller shaft, with the drive sprocket and the roller shaft being suitably non-rotatably drivingly connected together by the drive member 31 so long as the external loads imposed on the roller do not exceed the maximum torque-transmitting capacity of the torque-limiting drive mechanism.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a torque-limiting drive mechanism, the combination comprising:
   a first member supported for rotation about an axis, and a second member supported for rotation about said axis, said first and second members being supported for rotation relative to one another, and one of said members being adapted for driving connection with a power source;
   said first and second members defining a pair of concentric opposed surfaces which are radially spaced apart and define a substantially annular recess therebetween, one of said surfaces being rotatable with one of the members, and the other of said surfaces being rotatable with the other of said members;
   a non-circular resilient device interposed between said pair of surfaces for creating a torque-limiting driving path between said first and second members to cause the latter to synchronously rotate as a unit, said non-circular resilient device comprising a multiple coil spring member which is radially spirally wound and is solely in frictional engagement with one of said surfaces, the frictional engagement between said spring member and said one surface occurring solely through one or more small points of frictional contact;
   the spring member including an inner annular hub portion which is fixedly anchored with respect to the inner one of said surfaces, said spring member also including an outer curved portion which is spaced radially outwardly from the hub portion and is frictionally engaged with said other surface at a plurality of angularly spaced points; and
   said spring member further including an elongated resilient ramp portion which extends spirally outwardly from the hub portion and is joined to the outer curved portion, said ramp portion extending through at least one-half of a revolution.

2. The mechanism of claim 1, wherein the outer curved portion of said spring member frictionally engages the outer surface in at least two points which are approximately diametrically opposite one another.

3. The mechanism of claim 2, wherein the first member comprises an annular member having external driving means thereon adapted for driving engagement with an external power source, said first member having an annular recess therein defined by the outer surface, the second member comprising a shaft which is rotatably supported and extends coaxially of the first member, the shaft having the inner surface defined thereon, and a bearing structure positioned between the first and second member for permitting relative rotation therebetween.

4. The mechanism of claim 1, wherein the outer curved portion extends through an arcuate extent of at least approximately one-half revolution and is generated about a radius which is greater than the radius of said other surface, the outer curved portion being generated about a first center point, and said inner hub portion being generated about a second center point which is disposed between said first center point and said outer curved portion.

5. In a powered roller conveyor having a frame, a shaft member rotatably supported on said frame and having a roller non-rotatably associated therewith, and a rotatable drive member coaxially aligned with said shaft member for rotatably driving same, the improvement wherein said drive member is rotatably supported on said shaft member, and a torque-limiting drive mechanism operatively connected between said drive member and said shaft member for non-rotatably connecting same together when the torque transmitted therebetween is less than a preselected magnitude while permitting relative rotation between said drive and shaft members when the torque exceeds said preselected magnitude, said torque-limiting drive mechanism comprising a multiple coil spring which is radially spirally wound and includes a mounting portion which is fixedly held in non-rotatable relationship with respect to one of said members, said spring also including a curved portion spaced radially from said mounting portion and engaged with said other member solely at a small number of angularly spaced friction points which are individually of small area, and said spring further including an elongated resilient ramp portion which extends spirally between and is joined to said mounting and curved portions, said ramp portion extending through at least one-half revolution.

6. A conveyor according to claim 5, wherein said curved portion of said spring frictionally engages said other member in at least two spaced points which are approximately diametrically opposite one another.

* * * * *